(12) United States Patent
Sandberg et al.

(10) Patent No.: US 7,051,844 B2
(45) Date of Patent: May 30, 2006

(54) COMPACT DISC SUPPORT

(75) Inventors: Stefan Sandberg, Lomma (SE); Joakim Gripemark, Helsingborg (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 10/661,243

(22) Filed: Sep. 12, 2003

(65) Prior Publication Data
US 2004/0124048 A1    Jul. 1, 2004

Related U.S. Application Data

(63) Continuation of application No. PCT/SE02/00451, filed on Mar. 13, 2002.

(30) Foreign Application Priority Data
Mar. 13, 2001 (SE) .................. 0100841-6

(51) Int. Cl.
*B60T 1/06* (2006.01)
(52) U.S. Cl. ............... 188/71.5; 188/281 XL; 188/18 A
(58) Field of Classification Search ......... 188/218 XL, 188/18 A, 71.5; 192/70.2; 301/6.8; 403/359.1, 403/359.4
See application file for complete search history.

(56) References Cited

U.S. PATENT DOCUMENTS

| | | | | |
|---|---|---|---|---|
| 3,915,272 A * | 10/1975 | Maurice | ................. | 192/70.2 |
| 3,940,159 A | 2/1976 | Pringle | ................. | 280/96.1 |
| 4,844,206 A * | 7/1989 | Casey | ................. | 188/18 A |
| 5,449,052 A | 9/1995 | Macke et al. | ................. | 188/71.9 |
| 5,909,789 A * | 6/1999 | Ilzig et al. | ................. | 192/115 |
| 6,223,863 B1 * | 5/2001 | Bunker | ................. | 188/18 A |
| 6,419,065 B1 * | 7/2002 | Mieda | ................. | 192/70.2 |
| 6,705,437 B1 * | 3/2004 | Severinsson et al. | .... | 188/73.32 |
| 6,712,184 B1 * | 3/2004 | Thorpe et al. | ........ | 188/218 XL |

FOREIGN PATENT DOCUMENTS

| | | | |
|---|---|---|---|
| JP | 2001-32854 | * | 2/2001 |
| WO | WO 98/25804 | * | 6/1998 |

* cited by examiner

Primary Examiner—James McClellan
Assistant Examiner—Bradley King
(74) Attorney, Agent, or Firm—St. Onge Steward Johnston & Reens LLC

(57) ABSTRACT

The present invention concerns a connection between at least one brake disc and a hub or the like of a disc brake. The brake disc(s) is received slidable and non-rotatable on the hub. Each brake disc is furnished with plates on an inner periphery, which plates have a length in the axial direction of the hub exceeding the thickness of the brake disc.

6 Claims, 3 Drawing Sheets

COMPACT DISC SUPPORT

This application is a continuation of pending International Patent Application No. PCT/SE02/00451 filed on Mar. 13, 2002, which designates the United States and claims priority of pending Swedish Application No. 0100841-6 filed on Mar. 13, 2001.

FIELD OF THE INVENTION

The present invention concerns a means for connecting one or more brake discs non-rotatable but slideable in relation to a hub or the like.

PRIOR ART

It is previously known to use splines to arrange e.g. one or more brake disc slidable but non-rotatable on a hub. Due to an often limited, available space the discs must be made relatively thin. The thin discs are susceptible to locking due to becoming skewed, i.e. the discs become inclined.

SUMMARY OF THE INVENTION

The problem with locking due to skewed discs may be solved by making the discs rather thick. However, if the available space is limited it may not be possible to have discs that are thick enough. Thus, one object of the present invention is to save space and weight and yet avoid the above problems.

The above object is meet by a connection between at least one brake disc and a hub or the like, which brake disc is received slidable and non-rotatable on the hub or the like. Each brake disc is furnished with plates on the inner periphery. The length of the plates in the axial direction of the hub or the like exceeds the thickness of the brake disc.

If the thin discs become inclined they will be locked if the friction against the surrounding parts is too big. It could be could a self-locking effect. This self-locking effect could be compared to a drawer becoming locked in the beginning of an inward movement. When the drawer has been inserted beyond a certain point there is no risk of locking. Thus, the length of the plates of the brake disc should be long enough to avoid the risk of the self-locking as discussed above.

A second object of the present invention is to reduce the thermal stress, the risk for cracks and wear of the discs and thus reduce the frequency of replacement of them.

A further object of the present invention is to eliminate or at least reduce the noise generation and wear of the connection between the hub and each disc.

Further objects and advantages of the invention will be obvious for a person skilled in the art from reading the detailed description below of preferred embodiments of the invention.

DETAILED DESCRIPTION OF PREFERRED EMBODIMENTS

The present invention will be described in connection with a brake disc. Even though the disc brake is developed for heavy vehicles it may be used for any type of vehicle.

Figure 1:
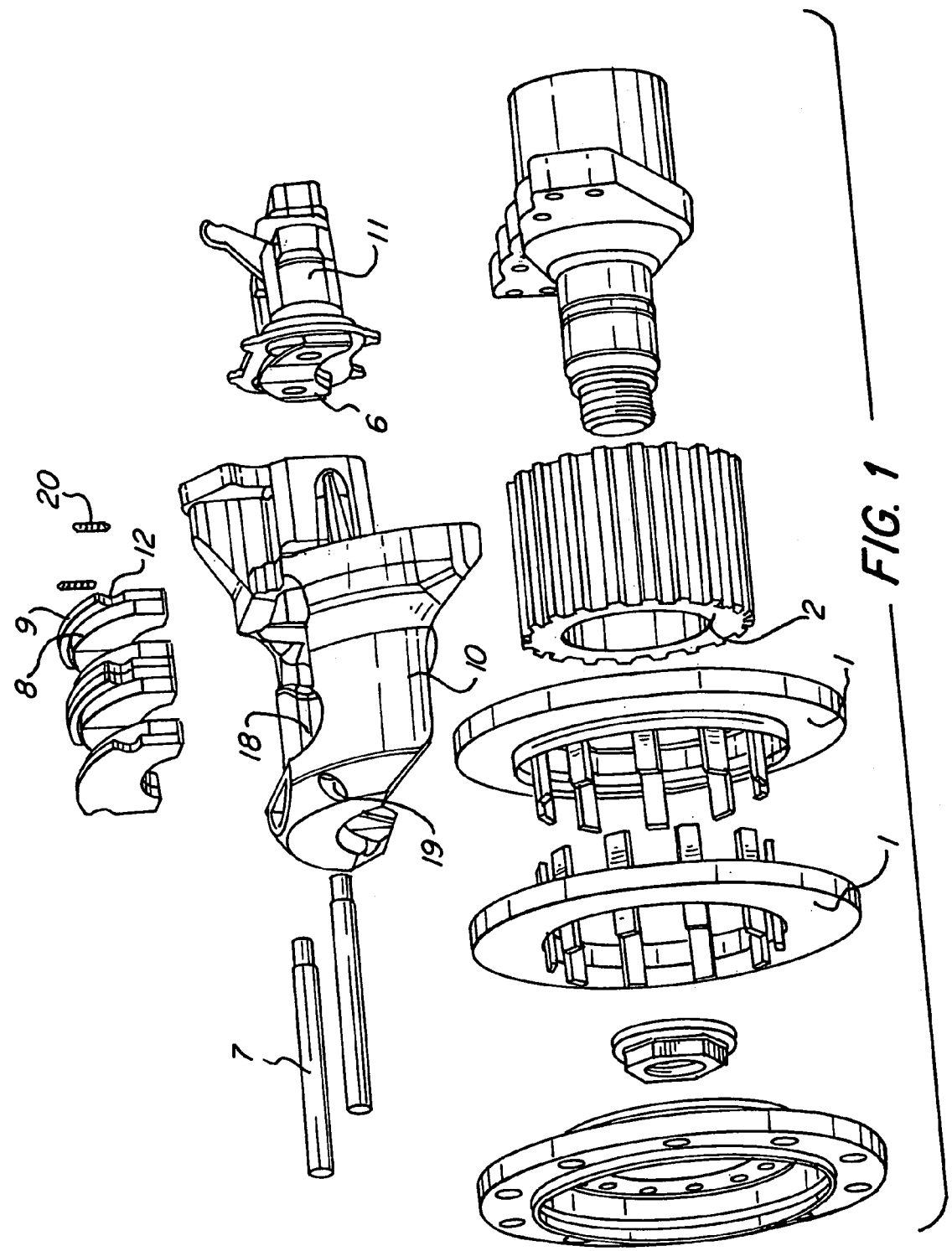
FIG. 1 is an exploded view of a disc brake comprising the invention.

The discs 1 and the hub 2 of the disc brake of FIG. 1 are connected to each other by means of a kind of splines connection. The hub 2 has a number of tooth gaps 4 and teeth 5 on the outer periphery. The discs 1 have a number of plates 3 on their inner periphery. The plates 3 of the discs 1 are to be received in the tooth gaps 4 of the hub 2.

The plates 3 of the discs 1 are normally an integrated part of the discs 1 formed together with the discs 1. In other embodiments (not shown) the plates are attached to the discs 1 by means of welding, soldering, gluing or the like.

The plates 3 of the discs 1 have a length in the axial direction of the hub 2, which length exceeds the thickness of the discs 1. Hereby, the discs 1 will have an improved support comparable to if the discs 1 had the same thickness as the length of the plates 3. Normally the length of the plates 3 is at least 50% and preferably at least 100% larger than the thickness of each brake disc 1.

The length should preferably be long enough to avoid a self-locking effect as indicated above. The exact length to be exceeded depends mainly on the friction of the plates and surrounding material, the play between the plates and surrounding material.

In this description the expressions "axial" and "radial" and similar expressions are in reference to the axis of the hub.

Each plate 3 is normally placed unsymmetrical on the disc 1, i.e. the plates 3 extend at different lengths from the opposite sides of the disc 1. This is done to make use of the limited available space. In other embodiments (not shown) the plates 3 will only extend from one side of the disc 1. Furthermore, the length of the plates 3 may vary on the same side of the disc 1. Thus, it is possible to alternate with long and short plates 3 on both sides of the same brake disc 1.

Figure 2:
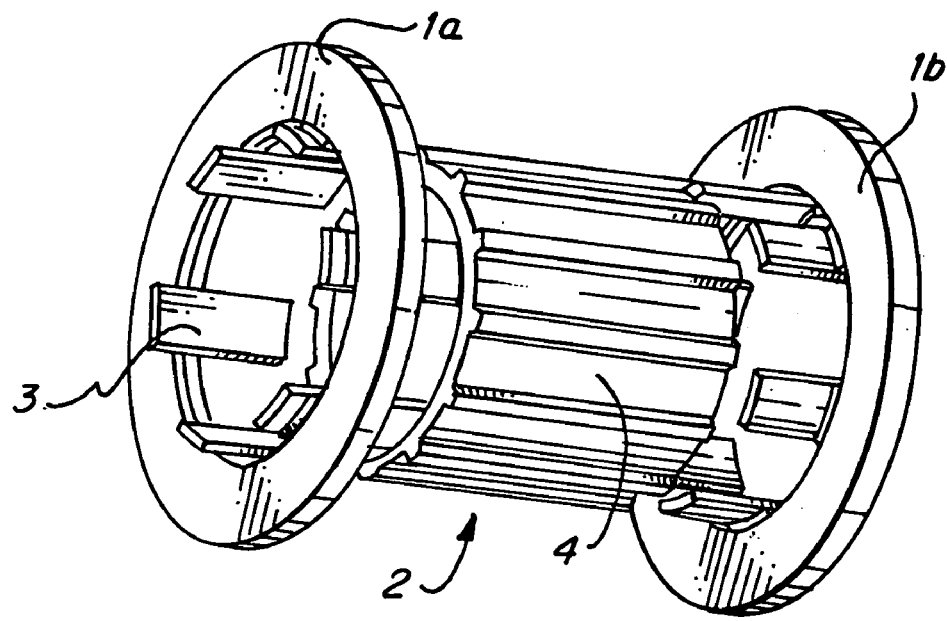
FIG. 2 is a perspective view of a hub and two brake discs according to the invention in a first position.
Figure 3:
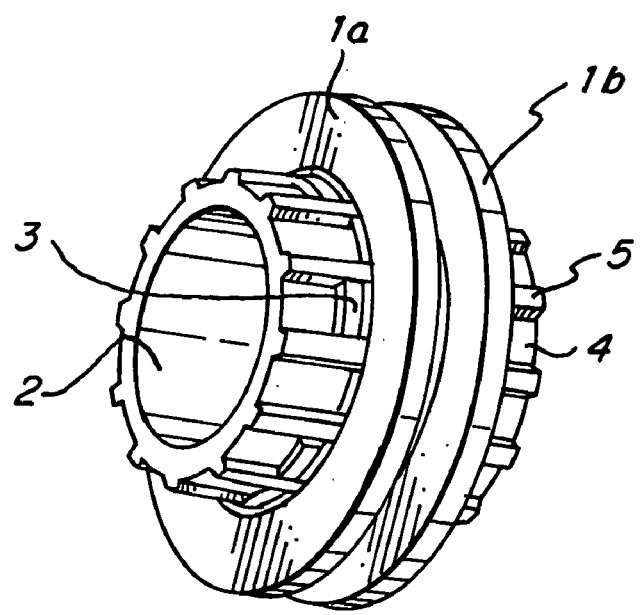
FIG. 3 is a perspective view of the hub and brake discs of FIG. 2 in a second position.

In FIG. 2 the discs 1a, b are shown schematically before assembly on the hub 2 and in FIG. 3 the discs 1a, b are shown after assembly. In the shown embodiment the plates 3 of a first disc 1a are received in every second tooth gap 4 of the hub 2. The plates 3 of a second disc 1b are received in every second tooth gap 4 of the hub 2, but not the same gaps 4 as the plates 3 of the first disc 1a. In this way the plates 3 of adjacent discs 1a, b are placed overlapping in the axial direction of the hub 2. If three discs 1 are present the plates 3 may be placed in every third tooth gap 4 and so on. Put in other words the plates 3 are placed in every n:th tooth gap 4, where n is the number of discs 1 of the disc brake. It is also possible to still place the plates 3 in every second tooth gap 4 if the length of the plates 3 is such that there will be no interference, i.e. the plates 3 should not risk to collide when the brake pads are worn out.

A person skilled in the art realises that the plates 3 may be arranged in any suitable pattern. It is possible to let a first disc 1 have two or more plates 3 in adjacent tooth gaps 4 followed by two or more plates from another disc 1 in the next adjacent tooth gaps 4 and so on. Thus, it is possible to mix longer and shorter plates 3 in any order between the different discs 1, as long as it does not impair the axial movement of the discs 1.

If the brake has three brake discs 1 the plates 3 of the disc 1 placed in the middle will normally be placed symmetrically, i.e. the plates 3 will extend the same length on both sides of the disc 1.

The circumferential length of the plates 3 of the brake disc 1 exceeds the circumferential length of the teeth 5 of the hub 2.

The geometry of the discs 1 at the inner periphery is adapted to reduce the possible thermal stressing. Also the geometry of the teeth 5 of the hub 2 are adapted to reduce possible thermal stressing. Thermal stressing may occur in the brake discs becoming hot at breaking.

A further consequence of the design with relatively thin discs 1 is that the weight will go down.

In the embodiment of FIG. 1 two brake discs 1 are received on a rotating hub 2. The brake discs 1 are carried axially moveable but non-rotatable in relation to the hub 2. The brake discs 1 and brake pads 8 are moved axially on the hub 2 by means of one or more thrust plates 6.

The brake pads 8 placed between the brake discs 1 are in one embodiment formed of a single support 9 having brake linings on both sides of the support 9.

In the upper part of a caliper 10 for the disc brake an opening 18 is provided. The brake pads 8 are inserted and removed via the opening 18 of the caliper 10. In the caliper 10 two guide pins 7 are arranged essentially perpendicular to the disc(s) 1 in longitudinal grooves 19. The guide pins 7 are removably attached to the caliper 10 by means of locking pins 20 or any other suitable fastening means.

When the brake pads 8 are to be replaced the locking pins 20 fixing the guide pins 7 to the caliper 10 are loosened. Then the guide pins 7 are drawn out of the grooves 19, whereby the brake pads 8 may be lifted out of the caliper 10. The new brake pads 8 are brought down through the opening 18 of the caliper 10. The guide pins 7 are then reinserted in the grooves 19, whereby the recesses 12 of the brake pads 8 are to be positioned to receive the guide pins 7. Finally, the guide pins 7 are fixed to the caliper 10 by means of the locking pins 20 or the like.

Thus, the brake pads 8 are arranged moveable in an axial direction on the guide pins 7.

As stated above the brake discs 1 are received on the hub 2. During motion of the vehicle the hub 2 will rotate. The connection between the hub 2 and the brake discs 1 has the form of a splines connection. The splines connection allows axial movement for the brake discs 1 but transfer the rotational movement of the hub 2 to the brake discs 1.

Figure 4:
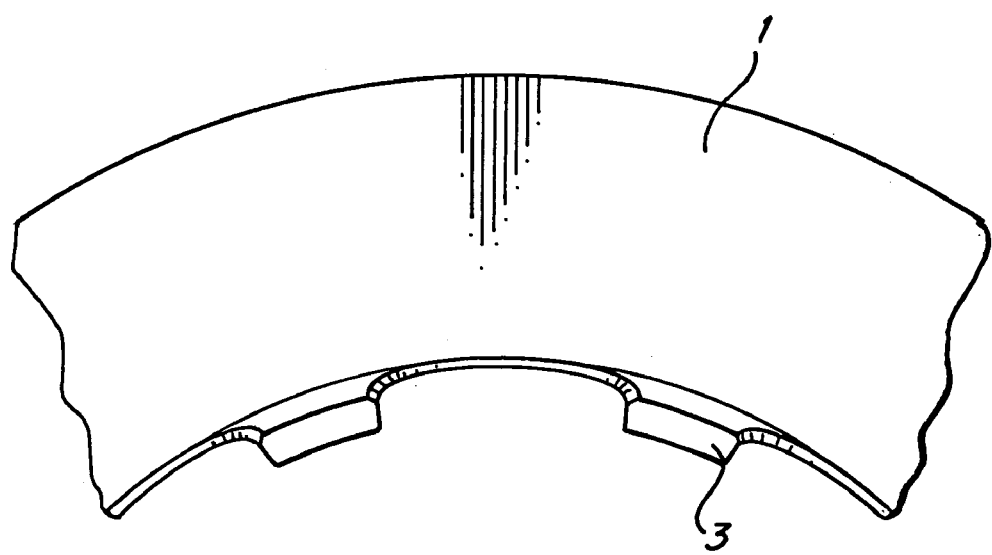
FIG. 4 shows one example on the form of the tooth gaps on the brake disc.

In order to reduce the heat transfer the inner periphery of the brake disc 1 may have a curve form as indicated in FIG. 4. The form of the inner periphery in FIG. 4 is only given as an example and a person skilled in the art realises that it may have many different forms. By the curve form the physical contact between the brake discs 1 and the hub 2 is reduced and, thus, the heat transfer is reduced.

In use the disc brake will in normal way be actuated by means of a brake mechanism 11 actuated by an actuator (not shown), preferably a pneumatic actuator. In other embodiments a hydraulic or electrically actuator is used. As the actuating mechanism forms no part of the present invention it will not be described further here. One example for an actuating mechanism 11 is indicated in FIG. 1.

When the brake is activated the brake mechanism 11 will move the thrust plate 6 or thrust plates in the direction towards the brake discs 1. In this movement the thrust plate 6 or plates will bring the brake pads 8 into contact with the brake discs 1. All the brake pads 8 and brake discs 2 will be moved by the thrust plate 6 or plates except possibly the last brake pad 8, i.e. the brake pad 8 furthest from the thrust plate 6 or plates. When the brake pads 8 and the brake discs 1 come into contact the rotation of the hub 2 will be slowed down or stopped in normal way. This will in turn reduce the speed of the vehicle or stop it. The tangential load on the brake pads 8 will be taken up by the guide pins 7 received in the caliper 10.

A person skilled in the art realises that the number of brake discs 1 may be varied without departing from the scope of the present invention as defined by the enclosed claims.

What is claimed is:

1. A connection between at least two brake discs and a hub of a disc brake, in which each of the at least two brake discs is positioned slidably and non-rotatably on the hub, characterized in that each of the at least two brake discs includes a plurality of plates attached on an inner periphery, each of the plates having a length in the axial direction of the hub exceeding the thickness of a corresponding one of the at least two brake discs, each of the plates being received in a corresponding one of a plurality of tooth gaps disposed on the hub, the plates of adjacent discs of the at least two brake discs being not placed in the same tooth gaps and that they overlap in the axial direction when they are positioned on the hub.

2. The connection according to claim 1, characterized in that the length of each of the plates is long enough to avoid the risk of self-locking.

3. The connection according to claim 1, characterized in that the length of each of the plates is at least 50% larger than the thickness of each disc.

4. The connection according to claim 1, characterized in that the plates of each of the at least two brake discs are received one in every n-th tooth gap of the hub, where n is the number of brake discs of the disc brake.

5. The connection according to claim 1, characterized in that the plates of each of the at least two brake discs are received one in every second tooth gap of the hub.

6. The connection according to claim 1, characterized in that the circumferential length of each of the plates of the at least two brake discs exceeds the circumferential length of the teeth of the hub.

\* \* \* \* \*